（12） United States Patent
Fleischmann et al.

(10) Patent No.: US 12,479,157 B2
(45) Date of Patent: Nov. 25, 2025

(54) THREE-DIMENSIONAL PRINTING

(71) Applicant: PERIDOT PRINT LLC, Palo Alto, CA (US)

(72) Inventors: Carolin Fleischmann, San Diego, CA (US); Emre Hiro Discekici, San Diego, CA (US); Emily Levin, San Diego, CA (US)

(73) Assignee: Peridot Print LLC, Palo Alto, CA (US)

( * ) Notice: Subject to any disclaimer, the term of this patent is extended or adjusted under 35 U.S.C. 154(b) by 0 days.

(21) Appl. No.: 18/689,772

(22) PCT Filed: Sep. 30, 2021

(86) PCT No.: PCT/US2021/052841
§ 371 (c)(1),
(2) Date: Mar. 6, 2024

(87) PCT Pub. No.: WO2023/055374
PCT Pub. Date: Apr. 6, 2023

(65) Prior Publication Data
US 2024/0391164 A1    Nov. 28, 2024

(51) Int. Cl.
*B29C 64/165*    (2017.01)
*B33Y 10/00*    (2015.01)
*B33Y 70/00*    (2020.01)
B29K 77/00    (2006.01)
B29K 105/00    (2006.01)
B29K 275/00    (2006.01)

(52) U.S. Cl.
CPC ............ *B29C 64/165* (2017.08); *B33Y 10/00* (2014.12); *B33Y 70/00* (2014.12); *B29K 2077/00* (2013.01); *B29K 2105/251* (2013.01); *B29K 2275/00* (2013.01); *B29K 2995/0077* (2013.01)

(58) Field of Classification Search
CPC .... B33Y 10/00; B33Y 70/00; B29K 2077/00; B29K 2105/251; B29C 64/165
See application file for complete search history.

(56) References Cited

U.S. PATENT DOCUMENTS

| | | | |
|---|---|---|---|
| 9,605,191 B2 | 3/2017 | Park et al. | |
| 11,028,217 B1 | 6/2021 | Knauer et al. | |
| 2017/0145155 A1* | 5/2017 | Wright | ................ C08G 63/672 |
| 2019/0039309 A1 | 2/2019 | Busbee et al. | |
| 2020/0181351 A1 | 6/2020 | Bailey et al. | |
| 2021/0401126 A1 | 12/2021 | Wang | |
| 2023/0159776 A1 | 5/2023 | Discekici et al. | |

FOREIGN PATENT DOCUMENTS

| | | |
|---|---|---|
| CN | 111393736 A | 7/2020 |
| EP | 3590379 A1 | 1/2020 |
| WO | 2017/068415 A1 | 4/2017 |
| WO | 2019/217642 A1 | 11/2019 |
| WO | 2019/221708 A1 | 11/2019 |
| WO | 2020/251541 A1 | 12/2020 |

* cited by examiner

*Primary Examiner* — Mark S Kaucher
(74) *Attorney, Agent, or Firm* — Dierker & Kavanaugh, P.C.

(57) ABSTRACT

A polyol stiffening additive in a powder bed material for three-dimensional (3D) printing is disclosed herein. In an example, the 3D powder bed material includes an elastomeric build material and a polyol stiffening additive having 3 to 7 carbon atoms that is about 2 weight percent to about 20 weight percent of a total weight of the 3D powder bed material.

14 Claims, 2 Drawing Sheets

THREE-DIMENSIONAL PRINTING

BACKGROUND

Three-dimensional (3D) printing is an additive printing process used to make 3D solid parts from a digital model. 3D printing is often used in rapid product prototyping, mold generation, mold master generation, and short run manufacturing. Some 3D printing techniques are considered additive processes because they involve the application of successive layers of material. This is unlike customary machining processes, which often rely upon the removal of material to create the final part. 3D printing often uses curing or fusing of the building material, which for some materials is accomplished using heat-assisted extrusion, melting, or sintering.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having an earlier described function may or may not be described in connection with other drawings in which they appear.

DETAILED DESCRIPTION

Figure 1:
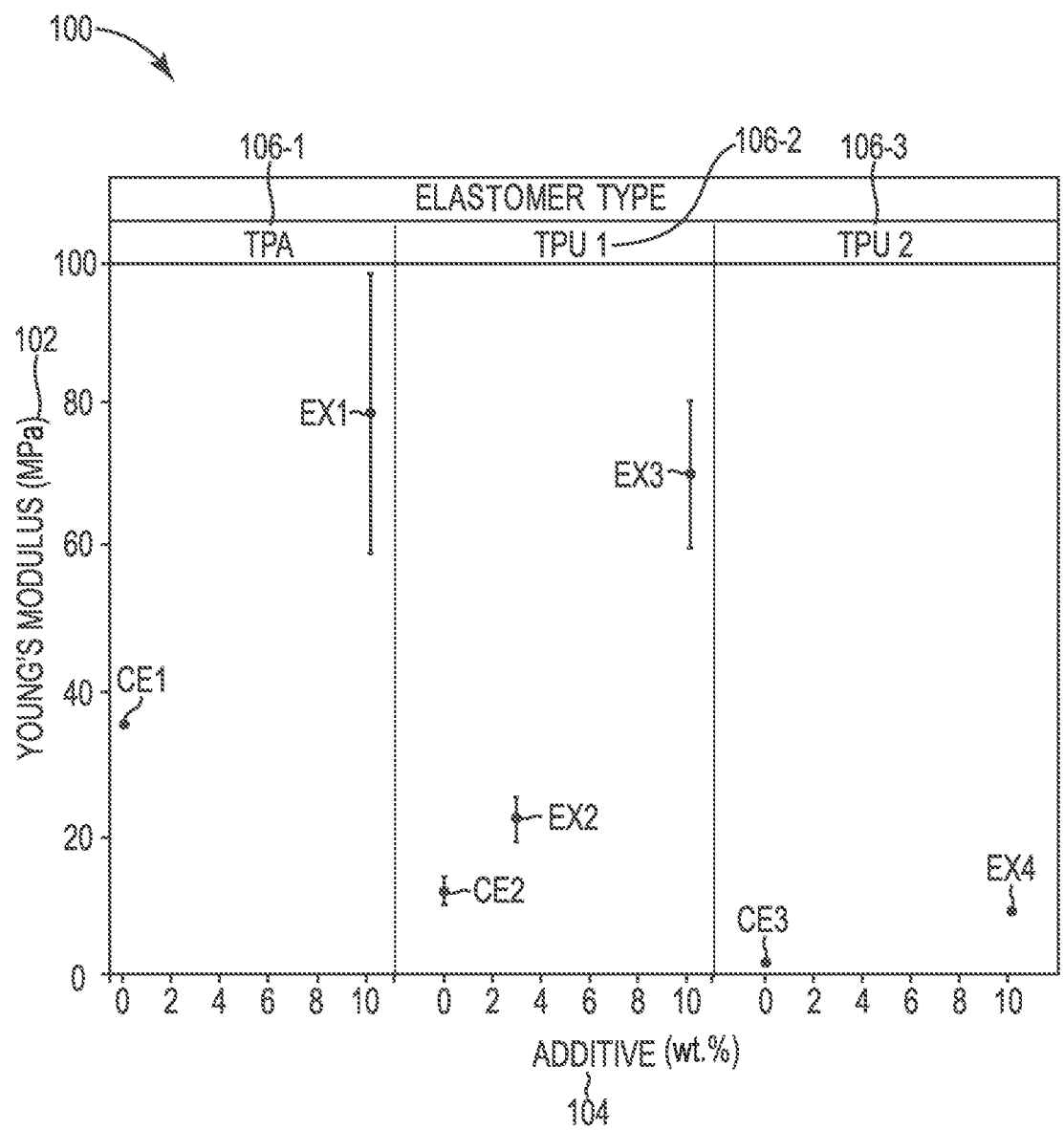
FIG. 1 is a graph showing mean Young's Modulus values of different 3D injection molded articles formed from 3D powder bed material formulations with various amounts of polyol stiffening additive.

Properties of a 3D article such as mechanical strength, visual appearance, and so on vary. Some approaches employ physical additives to vary the properties. For instance, some approaches employ fillers (e.g., silica) and/or fibers (e.g., glass fibers) to alter the properties of 3D parts or objects formed via injection molding. However, such physical additives present operability issues (e.g., nozzle clogging), exacerbate component wear, and/or when present inherently hinder aspects (e.g., fusing) in a 3D printing process such as a Multi Jet Fusion Printing (MJFP). During MJFP, a layer of a build material (also referred to as build material particles) is exposed to radiation, but a selected region (in some instances less than the entire layer) of the build material is fused and hardened to become a layer of a 3D printed part or object.

As such, approaches herein provide 3D powder bed materials that form 3D printed articles. For instance, the 3D powder bed materials include an elastomeric build material and a polyol stiffening additive. Examples described herein show the 3D powder bed materials including the polyol stiffening additive form 3D printed articles with enhanced stiffness (e.g., having increased Young's Modulus), as compared to a 3D article formed from a 3D powder bed material in the absence of the polyol stiffening additive. Examples described herein further show the 3D powder bed materials including the polyol stiffening additive form 3D printed articles in the absence of fillers and/or fibers, and yet still realize the enhanced stiffness.

3D Powder Bed Material

Described herein is the 3D powder bed material comprising an elastomeric build material and a polyol stiffening additive. In some examples, the 3D powder bed material comprises:
(i) an elastomeric build material; and
(ii) a polyol stiffening additive having 3 to 7 carbon atoms that is about 2 weight percent to about 20 weight percent of a total weight of the 3D powder bed material.

In some examples, the elastomeric build material is about 99 to about 80 weight percent of a total weight of a 3D powder bed material and a polyol stiffening additive is about 1 to about 20 weight percent of the total weight of the 3D powder bed material. In some examples, the elastomeric build material is about 98 to about 80 weight percent of a total weight of a 3D powder bed material and a polyol stiffening additive is about 2 to about 20 weight percent of the total weight of the 3D powder bed material. In some examples, the elastomeric build material is about 97 weight percent or greater of a total weight of the 3D powder bed material and the polyol stiffening additive is about 3 weight percent or less of the total weight of the 3D powder bed material. In some examples, the elastomeric build material is about 90 weight percent or greater of a total weight of the 3D powder bed material and the polyol stiffening additive is about 10 weight percent or less of the total weight of the 3D powder bed material. In some examples, the elastomeric build material is 90 weight percent of a total weight of the 3D powder bed material and a polyol stiffening additive is 10 weight percent of the total weight of the 3D powder bed material. In some examples, the elastomeric build material is greater than 90 weight percent of a total weight of a 3D powder bed material and a polyol stiffening additive is less than 10 weight percent of the total weight of the 3D powder bed material.

In some examples, a sum of a weight percent of an elastomeric build material and a weight percent of a polyol stiffening additive is equal to a total weight of a 3D powder bed material. Stated differently, a 3D powder bed material, in some instances, is formed exclusively of a mixture of an elastomeric build material and a polyol stiffening additive and therefore does not include fillers or fibers. However, in some instances additional components (e.g., colorants, antioxidants, flow aids, etc.) other than fillers and/or fibers are included in the 3D powder bed material.

Polyol Stiffening Additive

Described herein is a polyol stiffening additive having a total of 3 to 7 carbon atoms. In some examples, the polyol stiffening additive has a total of 3 to 6 carbon atoms. In some examples, the polyol stiffening additive has a total of 3 to 5 carbon atoms. In some examples, the polyol stiffening additive has a total of 3 to 4 carbon atoms. In some examples, the polyol stiffening additive has a total of 5 carbon atoms. In some examples, the polyol stiffening additive has a total of 4 carbon atoms. In some examples, the polyol stiffening additive has a total of 3 carbon atoms. In some examples, the polyol stiffening additive is formed of a combination of a plurality of polyol stiffening additives each having a total of 3 to 7 carbon atoms.

In some examples, the polyol stiffening additive is a diol, a triol, a tetrol, or any combination thereof. As used herein, a "polyol" refers to an organic molecule having an average hydroxyl functionality of greater than 1.0 hydroxyl groups per molecule. For instance, a "diol" refers to an organic molecule having an average hydroxyl functionality of 2, a "triol" refers to an organic molecule having an average hydroxyl functionality of 3, and a "tetrol" refers to an organic molecule having an average hydroxyl functionality of 4. As used herein, a "average hydroxyl functionality" (i.e., an average nominal hydroxyl functionality) refers to a number average functionality, e.g., a number of hydroxyl groups per molecule, of a polyol or a polyol composition based upon a number average functionality, e.g., a number of active hydrogen atoms per molecule. As used herein, "average" refers to number average unless indicated otherwise.

In some examples, the polyol stiffening additive is a diol. Examples of suitable diols include diols having a total of 3 to 7 carbon atoms or a total of 3 to 5 carbon atoms such as 1,5-Pentanediol.

In some examples, the polyol stiffening additive is a triol. Examples of suitable triols include triols having a total of 3 to 7 carbon atoms or a total of 3 to 5 carbon atoms such as glycerol.

In some examples, the polyol stiffening additive is a tetrol. Examples of suitable tetrols include tetrols having a total of 3 to 7 carbon atoms or a total of 3 to 5 carbon atoms such as erythritol and pentaerythritol.

In some examples, the polyol stiffening additive is selected from pentaerythritol, erythritol, glycerol, 1,5 pentanediol, xylitol, or any combination thereof. In some examples, the polyol stiffening additive is selected from pentaerythritol, erythritol, 1,5 pentanediol, or any combinations thereof. In some examples, the polyol stiffening additive is selected from pentaerythritol, erythritol, or a combination thereof. In some examples, the polyol stiffening additive is pentaerythritol (available from Sigma-Aldrich); referred to herein as "PSA"). In some examples, the polyol stiffening additive is erythritol. In some examples, the polyol stiffening additive is glycerol. In some examples, the polyol stiffening additive is 1,5 pentanediol. In some examples, the polyol stiffening additive is xylitol.

As mentioned, in some instances the polyol stiffening additive is present in an amount from about 2 to about 20 weight percent of a total weight the 3D powder bed material. All individual values and sub-ranges about 2 to about 20 weight percent are included. In some examples, the polyol stiffening additive is present in an amount in a range from a lower value of about 2, about 3, about 4, about 5, about 6, about 7, or about 8 weight percent of a total weight the 3D powder bed material to an upper value of about 9, about 10, about 11, about 12, about 13, about 14, about 15, about 16, about 17, about 18, about 19, or about 20 weight percent of the total weight the 3D powder bed material. In some examples, the polyol stiffening additive is about 2 to about 10 weight percent, about 3 to about 10 weight percent, or about 5 to 10 weight percent of a total weight the 3D powder bed material. In some examples, the polyol stiffening additive is equal to or less than about 10 weight percent of a total weight the 3D powder bed material. In some examples, the polyol stiffening additive is less than 10 weight percent of a total weight the 3D powder bed material.

In some examples, the polyol stiffening additive is about 2, about 3, about 4, about 5, about 6, about 7, about 8, about 9, about 10, about 11, about 12, about 13, about 14, about 15, about 16, about 17, about 18, about 19 or about 20 weight percent of a total weight the 3D powder bed material. For instance, in some examples, the polyol stiffening additive is about 10 weight percent of a total weight the 3D powder bed material. In some examples, the polyol stiffening additive is 10 weight percent of a total weight the 3D powder bed material.

In some instances, the build material is the balance of the total weight the 3D powder bed material.

Elastomeric Build Material

The elastomeric build material (i.e., build material) includes a powder, a liquid, a paste, or a gel. Core shell polymer particles of these materials are also suitable.

In some instances, the build material has a melting point ranging from about 50° Celsius (° C.) to about 400° C. As examples, the build material may be a polyamide having a melting point of 180° C., or thermoplastic polyamides or thermoplastic polyurethanes having a melting point ranging from about 100° C. to about 165° C.

The build material is made up of similarly sized particles or differently sized particles. In some examples, the build material includes particles of two different sizes. The term "size," as used herein with regard to the build material, refers to the diameter of a spherical particle, or the average diameter of a non-spherical particle (e.g., the average of multiple diameters across the particle). In an example, the average size of the particles of the build material ranges from about 0.1 µm to about 200 µm, about 30 µm to about 200 µm, about 0.1 µm to about 100 µm, or from about 1 µm to about 80 µm, or from about 5 µm to about 50 µm as determined by Malvern dynamic light scattering. As used herein, "average" when referring to numerical ranges such as particle size refers to a number average of the diameter of the particles for spherical particles, or a number average of the volume equivalent sphere diameter for non-spherical particles. The volume equivalent sphere diameter is the diameter of a sphere having the same volume as the particle. Average particle size can be measured using a particle analyzer such as the MASTERSIZER™ 3000 available from Malvern Panalytical (United Kingdom). The particle analyzer can measure particle size using laser diffraction. A laser beam can pass through a sample of particles and the angular variation in intensity of light scattered by the particles can be measured. Larger particles scatter light at smaller angles, while small particles scatter light at larger angles. The particle analyzer can then analyze the angular scattering data to calculate the size of the particles using the Mie theory of light scattering. The particle size can be reported as a volume equivalent sphere diameter.

In some examples, the build material is a polyamide thermoplastic elastomer (TPA) or a thermoplastic polyurethane (TPU). In some examples, the build material is 100 weight percent, 90 weight percent, 80 weight percent, 70 weight percent, 60 weight percent, or 50 weight percent TPA based on a total weight of the build material. The balance of the build material is a build material additive. In some examples, the build material is 100 weight percent TPA based on a total weight of the build material. Suitable examples of TPA include (3D High Reusability TPA enabled by EVONIK available from HP, INC.; referred to herein as "TPA").

As mentioned, in some examples the build material is a TPU. In some examples, the build material is 100 weight percent, 90 weight percent, 80 weight percent, 70 weight percent, 60 weight percent, or 50 weight percent TPU based on a total weight of the build material. The balance of the build material is a build material additive. In some examples, the build material is 100 weight percent TPU based on a total weight of the build material. Suitable examples of the TPU include TPU with an elongation at break of ~380%, a UTS of ~7 MPa, a Young's Modulus of ~28 MPa and/or a particle size distribution with D10≥28 microns, D50≥70 microns, D90≤150 microns; (which are referred to herein as "TPU 1") when molded into a type V dog bone in accordance with the ASTM D638 standard and TPU with an elongation at break of ~4000%, a UTS of ~18

MPa, a Young's Modulus of ~3.5 MPa and/or a particle size distribution with D10≥40 microns. D50≥100 microns, D90≤210 microns (which are referred to herein as "TPU 2") when molded into a type V dog bone in accordance with the ASTM D638 standard.

In some examples, the elastomeric build material is about 80 to about 98 weight percent of a total weight of the 3D powder bed material and a polyol stiffening additive is about 2 to about 20 weight percent of the total weight of the 3D powder bed material. All individual values and sub ranges from about 80 to about 98 are included. In some instances, the elastomeric build material is about 98, about 96, about 94, about 92, about 90, about 88, about 86, about 84, about 82, or about 80 weight percent of a total weight of the 3D powder bed material. In some instances, the balance of the 3D powder bed material is the polyol stiffening additive.

Build Material Additives

In some examples, the build material includes, in addition to polymer particles, a charging agent, a flow aid, an antioxidant, or combinations thereof.

A charging agent in some instances is added, for instances, to suppress tribo-charging. Examples of suitable charging agents include aliphatic amines (which may be ethoxylated), aliphatic amides, quaternary ammonium salts (e.g., behentrimonium chloride or cocamidopropyl betaine), esters of phosphoric acid, or polyethylene glycol esters. Some suitable commercially available charging agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In an example, the charging agent is added in an amount ranging from greater than 0 wt % to less than 5 wt % based upon the total weight of the build material.

A flow aid is added in some instances to improve the coating flowability of the build material such as when particles of the build material are less than 25 μm in size. Examples of flow aids include tricalcium phosphate (E341), powdered cellulose (E460 (ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), or polydimethylsiloxane (E900). In an example, the flow aid is added in an amount ranging from greater than 0 wt % to less than 5 wt % based upon the total weight of the build material.

An antioxidant is added in some instances to the build material composition to prevent or slow molecular weight decreases of the surface treated polymer and/or may prevent or slow discoloration (e.g., yellowing) of the surface treated polymer by preventing or slowing oxidation of the surface treated polymer. In some examples, the antioxidant may discolor upon reacting with oxygen, and this discoloration may contribute to the discoloration of the build material composition. The antioxidant may be selected to minimize this discoloration. In some examples, the antioxidant may be a radical scavenger. In these examples, the antioxidant may include IRGANOX® 1098 (benzenepropanamide, N,N'-1, 6-hexanediylbis(3,5-bis(1,1-dimethylethyl)-4-hydroxy)), IRGANOX® 254 (a mixture of 40% triethylene glycol bis(3-tert-butyl-4-hydroxy-5-methylphenyl), polyvinyl alcohol and deionized water), and/or other sterically hindered phenols. In other examples, the antioxidant may include a phosphite and/or an organic sulfide (e.g., a thioester). The antioxidant may be in the form of fine particles (e.g., having an average particle size of 5 pm or less) that are dry blended with the surface treated polymer. In an example, the antioxidant may be included in the build material composition in an amount ranging from about 0.01 wt % to about 5 wt %, based on the total weight of the build material composition. In other examples, the antioxidant may be included in the build material composition in an amount ranging from about 0.01 wt % to about 2 wt % or from about 0.2 wt % to about 1 wt %, based on the total weight of the build material composition.

Ink Preparation

In some examples, a fusing agent may be prepared by mixing an absorber agent described herein, with a co-solvent, and a balance of water. The absorber agent may be present in an amount of from about 0.01 wt % to about 30 wt % based on the total weight of the fusing agent. The absorber agent may be a near infrared light absorber. As an example, the absorber agent may be any near IR dye or pigment. As one example, the fusing agent may be an ink-type formulation including carbon black as the absorber agent. An example of this ink-type formulation is commercially known as CM997A available from HP. Inc.

In some examples, a buffer mixture is added to the fusing agent by mixing the buffer mixture into the fusing agent.

In some examples, the fusing agent may be filtered to obtain the fusing agent used in the 3D printing methods described herein.

In some examples, a colored ink is prepared by first milling any colorant in water and a dispersant additive until a particular particle size of the colorant is obtained. Milling forms a colorant concentrate.

A balance of water may be added in a suitable amount, taking into account the weight percent of colorant concentrate that is to be added. With water included, the ink vehicle may be adjusted to a pH from about 8.0 to about 8.5 with potassium hydroxide (KOH), or another suitable base. The colorant concentrate may be added (e.g., drop-wise) to the ink vehicle until the colorant is present in an amount of from about 0.01 wt % to about 30 wt % based on the total weight of the colored ink composition.

Co-Solvent

In some instances, the ink includes a co-solvent. In some instances, the co-solvent is present in an amount ranging from about 0.1 wt % to about 20 wt % based on the total weight of the ink.

Some examples of co-solvents include 2-pyrrolidinone, hydroxyethyl-2-pyrrolidone, diethylene glycol, 2-methyl-1, 3-propanediol, tetraethylene glycol, tripropylene glycol methyl ether, dipropylene glycol methyl ether, tripropylene glycol butyl ether, dipropylene glycol butyl ether, triethylene glycol butyl ether, 1,2-hexanediol, 2-hydroxyethyl pyrrolidinone, 2-hydroxyethyl-2-pyrrolidinone, 1,6-hexanediol, glycerol, propylene glycol, benzyl alcohol, poly(ethylene glycol), and combinations thereof.

Water

The balance of the ink is water. As such, the amount of water varies depending upon the amounts of the absorber agent, colorant, dispersant, co-solvent, and buffer mixture, and in some instances an anti-kogation agent or other additive.

In some examples, water is present in the ink in amounts greater than about 50 wt % based on the total weight of the ink. In some examples, the water is present in the ink in amounts from about 10 wt % to about 90 wt %, 50 wt % to about 90 wt % based on the total weight of the ink. In other examples, the ink includes from about 60 wt % to about 88 wt % water. In further examples, the ink includes from about 70 wt % to about 85 wt % water.

Buffer Mixture

In some examples, the ink further includes a buffer mixture. In some examples, the buffer mixture withstands small changes (e.g., less than 1) in pH when small quantities of a water soluble acid or a water soluble base are added to a composition containing the buffer mixture. The buffer mixture has a pH in a range from about 5 to about 9.5, or from about 7 to about 9, or from about 7.5 to about 8.5.

In some examples, the buffer mixture is added to the ink in an amount ranging from about 0.01 wt % to about 20 wt %, or from 0.1 wt % to about 15 wt %, or from about 0.1 wt % to about 10 wt % based on the total weight of the ink.

In some examples, the buffer mixture includes at least one poly-hydroxy functional amine. In some examples, the buffer mixture is 2-[4-(2-hydroxyethyl) piperazin-1-yl]ethane sulfonic acid, 2-amino-2-(hydroxymethyl)-1,3-propanediol (TRIZMA® sold by Sigma-Aldrich), 3-morpholinopropanesulfonic acid, triethanolamine, 2-[bis-(2-hydroxyethyl)-amino]-2-hydroxymethyl propane-1,3-diol (bis tris methane), N-methyl-D-glucamine, N,N, N'N'-tetrakis-(2-hydroxyethyl)-ethylenediamine and N,N, N'N'-tetrakis-(2-hydroxypropyl)-ethylenediamine, beta-alanine, betaine, or mixtures thereof. In some examples, the buffer mixture is 2-amino-2-(hydroxymethyl)-1,3-propanediol (TRIZMA® sold by Sigma-Aldrich), beta-alanine, betaine, sodium carbonate, sodium bicarbonate or mixtures thereof.

Ink Additive

In some examples, the ink includes a dispersant, an anti-kogation agent, a dispersing additive, a biocide, an acrylic latex binder, or any combinations thereof.

The dispersing additive helps uniformly distribute the absorber agent, and when present the colorant, throughout the ink and/or aids in the wetting of the ink onto any other applied ink and/or the layer of the build material. The dispersing additive when present is in an amount ranging from about 0.01 wt % to about 0.8 wt % based on the total weight of the absorber agent or 0.1 wt % to about 5 wt % based on the total weight of the absorber agent. Some examples of the dispersing additive include a water soluble acrylic acid polymer (e.g., CARBOSPERSE® K7028 available from Lubrizol), a high molecular weight block copolymer with pigment affinic groups (e.g., DISPERBYK®-190 available BYK Additives and Instruments), and combinations thereof. The dispersant is non-ionic, cationic, anionic, or combinations thereof. Some further examples of the dispersant include a self-emulsifiable, non-ionic wetting agent based on acetylenic diol chemistry (e.g., SURFYNOL® SEF from Air Products and Chemicals, Inc.), an ethoxylated low-foam wetting agent (e.g., SURFYNOL® 440 and SURFYNOL® 465 from Air Products and Chemicals, Inc.), a non-ionic acetylenic diol surface active agent (e.g., SURFYNOL® 104 from Air Products and Chemicals, Inc.), a non-ionic, alkylphenylethoxylate and solvent free surfactant blend (e.g., SURFYNOL® CT-211 from Air Products and Chemicals, Inc.), a non-ionic organic surfactant (e.g., TEGO® Wet 510 from Evonik Industries AG), a non-ionic fluorosurfactant (e.g., CAPSTONE® fluorosurfactants from DuPont), non-ionic a secondary alcohol ethoxylate (e.g., TERGITOL® 15-S-5, TERGITOL® 15-S-7, TERGITOL® 15-S-9, and TERGITOL® 15-S-30 all from Dow Chemical Company), a water-soluble non-ionic surfactant (e.g., TERGITOL® TMN-6), and combinations thereof. Examples of anionic dispersants include those in the DOWFAX™ family (from Dow Chemical Company), and examples of cationic dispersants include dodecyltrimethylammonium chloride and hexadecyldimethylammonium chloride. Combinations of any of the other listed dispersants may also be used.

The ink may additionally include an anti-kogation agent, a biocide, an acrylic latex binder, and combinations thereof. Examples of anti-kogation agents include oleth-3-phosphate or polyoxyethyene (3) oleyl mono/di-phosphate (e.g., CRODAFOS® N-3A from Croda, now CRODAFOS® O3A), aqueous dispersion of fumed alumina or fumed silica (e.g., CAB-O-SPERSE® from Cabot Corp.), a metal chelator/chelating agent, such as methylglycinediacetic acid (e.g., TRILON® M from BASF Corp.), and combinations thereof. Examples of biocides include 1,2-benzisothiazolin-3-one as the active ingredient in ACTICIDE® B-20 (available from Thor GmbH), 2-methyl-4-isothiazolin-3-one as the active ingredient in ACTICIDE® M-20 (available from Thor GmbH), an aqueous mixture of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), an aqueous mixture of methyl-isothiazolone (e.g., KORDEK® MLX from The Dow Chemical Co.), 2-phenylethanol, 2-phenoxyethanol, and combinations thereof. Examples of the acrylic latex binder include a copolymer of any two or more of styrene, acrylic acid, methacrylic acid, methyl methacrylate, ethyl methacrylate, and butyl methacrylate.

When included, the anti-kogation agent is in some instances present in the ink in an amount ranging from about 0.10 wt % to about 1 wt %, the biocide is present in an amount ranging from about 0.01 wt % to about 0.40 wt %, and the acrylic latex binder is present in an amount ranging from about 2 wt % to about 10 wt %, each of which is with respect to the total weight of the ink.

The ink in some instances includes a binder or other additives, such as a humectant and lubricant (e.g., LIPONIC® EG-1 (LEG-1) from Lipo Chemicals), a chelating agent (e.g., disodium ethylenediaminetetraacetic acid (EDTA-Na)), and/or a buffer.

Methods of Using a Polyol Stiffening Additive

In some examples, a method of using polyol stiffening additive is described. The method of using the polyol stiffening additive comprises adding the polyol stiffening additive described herein to a build material to form a 3D powder bed material that forms a 3D printed article with enhanced stiffness.

The adding of the polyol stiffening additive described herein includes mixing, grinding, milling, compounding, and combinations thereof to form a substantially homogeneous mixture of the polyol stiffening additive and the build material in the 3D powder bed material described herein.

In some examples, a method of using polyol stiffening additive includes:

(i) applying a 3D powder bed material comprising a mixture of an elastomeric build material and a polyol stiffening additive having 3 to 7 carbon atoms to a fabrication bed; and (ii) fusing the 3D powder bed material to form a 3D printed article having enhanced stiffness as compared to a 3D printed article formed from the elastomeric build material in the absence of the polyol stiffening additive.

In some examples, a method to making a 3D printed article having enhanced stiffness includes:

(i) applying a 3D powder bed material comprising a mixture of an elastomeric build material and a polyol stiffening additive having 3 to 7 carbon atoms to a fabrication bed;

(ii) fusing the 3D powder bed material to form a 3D printed article having enhanced stiffness as compared to a 3D printed article formed from the elastomeric build material in the absence of the polyol stiffening additive;

(iii) selectively applying a fusing agent to the 3D powder bed material, (iv) responsive to selectively applying the fusing agent to the 3D powder bed material, fusing the 3D powder bed material to form the 3D printed article; and (v) repeating (i), (ii), (iii), and/or (iv).

Jetting Methods

In some examples, layers of the build material are applied in a fabrication bed of a 3D printer. In some examples, the applied layers are exposed to heating to pre-heat the build material. Thus, the heating temperature is below the melting point of the build material. As such, the temperature selected depends upon the build material that is used. As examples, the heating temperature is from about 5° C. to about 50° C. below the melting point of the build material. In an example, the heating temperature is in a range from about 50° C. to about 200° C. In another example, the heating temperature is in a range from about 150° C. to about 170° C. In another example, the heating temperature is in a range from about 90° C. to about 170° C. In another example, the heating temperature is in a range from about 90° C. to about 130° C.

Pre-heating the layer of the build material is accomplished using any suitable heat source that exposes all of the build material to the heat. Examples of the heat source include a thermal heat source or an electromagnetic radiation source (e.g., infrared (IR), microwave, or combination thereof).

After pre-heating the layer of the build material, a fusing agent described herein is selectively applied on at least a portion of the build material in the layer. The fusing agent described herein is dispensed from an inkjet printhead, such as a thermal inkjet printhead or a piezoelectric inkjet printhead. Examples of suitable printheads include a drop-on-demand printhead or a continuous drop printhead.

The printhead includes an array of nozzles through which drops of an aqueous ink composition comprising the fusing agent described herein are selectively ejected. In some examples, printhead delivers variable size drops of the aqueous ink composition comprising the fusing agent described herein.

Before or after selectively applying the fusing agent described herein on the portion of the build material, other colored ink, when present, is applied to a portion of the build material.

After the fusing agent and in some instances the colored ink is selectively applied in the specific portions of the layer of the build material, the entire object or part is exposed to infrared radiation.

The infrared radiation is emitted from a radiation source, such as an IR (e.g., near-IR) curing lamp, or IR (e.g., near-IR) light emitting diodes (LED), or lasers with specific IR or near-IR wavelengths. Any radiation source that emits a wavelength in the infrared spectrum, for example near-infrared spectrum is suitable. The radiation source is in some instances attached, for example, to a carriage that also holds the printhead. The carriage moves the radiation source into a position that is adjacent to the fabrication bed containing the 3D printed objects or parts. The radiation source is in some instance programmed to and/or able to receive commands from a central processing unit and to expose the layer of the build material including the inks to the infrared radiation.

The length of time the radiation is applied for, or energy exposure time, in some instances, is dependent on characteristics of the radiation source, characteristics of the build material, and/or characteristics of the ink.

The fusing agent described herein enhances the absorption of the radiation, convert the absorbed radiation to thermal energy, and promotes the transfer of the thermal heat to the build material in contact therewith. In an example, the fusing agent promotes sufficiently elevating the temperature of the build material above a melting point, allowing curing (e.g., sintering, binding, or fusing) of the build material particles to take place.

In some examples, portions of the build material that do not have the ink applied thereto do not absorb enough energy to fuse. However, the generated thermal energy may propagate into the surrounding build material that does not have the ink applied thereto. The propagation of thermal energy may cause at least some of the build material sans ink to partially fuse. In some instances, a detailing agent can be employed which includes a colorant that does not absorb the radiation used for fusing. The detailing agent may be applied outside of the edge boundary (i.e., the outermost portions where the fusing agent is selectively deposited onto the build material during 3D printing) of the 3D object during its formation. Since the colorant in the detailing agent does not absorb the fusing radiation, it combats coalescence bleed at the edge boundary. As such, the colorant in the detailing agent does not contribute to object growth (by fusing build material particles together), but rather contributes to edge acuity. Examples of the detailing agent also serve to reduce the degree of coalescence, or prevent coalescence of a portion of the build material on which the detailing agent has been delivered or has penetrated by providing an evaporative cooling effect. The cooling effect of the detailing agent reduces the temperature of the build material containing the detailing agent during radiation exposure. Since the build material, with detailing agent applied thereto, has a reduced temperature, the coalescence bleed may be reduced or prevented. As such, the detailing agent disclosed herein contributes to the generation of dimensionally accurate 3D objects in real-time without the need for post-object mechanical refining processes (e.g., tumbling, stone polishing, etc.).

Exposure to radiation, in some instances, completes formation of the 3D printed objects or parts.

In some examples, the completed 3D printed objects or parts are removed from the fabrication bed and any uncured build material is removed from the 3D parts or objects. In some examples, the uncured build material reused, for instance, is washed and then reused.

In some examples, the 3D powder bed material, when fused in a 3D printing process, provides a 3D printed article having a Young's Modulus determined in accordance with ASTM D638 that is increased by equal to or greater than 10% as compared to a Young's Modulus of a 3D printed article formed from the elastomeric build material in the absence of the polyol stiffening additive. In some examples, the 3D powder bed material, when fused in a 3D printing process, provides a 3D article having a Young's Modulus determined in accordance with ASTM D638 that is increased by at least about 10%, at least about 20%, at least about 30%, at least about 40%, at least about 50%, at least about 60%, at least about 70%, at least about 80%, at least about 90%, at least about 100%, at least about 110%, at least about 120%, at least about 130%, at least about 140%, at least about 150%, at least about 160%, at least about 170%, at least about 180%, at least about 190%, or at least about 200%. In some examples, the 3D powder bed material, when fused in a 3D printing process, provides a 3D article having a Young's Modulus determined in accordance with ASTM D638 that is increased by about 10%, about 20%, about 30%, about 40%, about 50%, about 60%, about 70%, about 80%, about 90%, or about 100%. In some examples, the 3D powder bed material, when fused in a 3D printing process, provides a 3D article having a Young's Modulus determined in accordance with ASTM D638 that is increased by about 10%, about 20%, about 30%, about 40%, or about 50%. In some examples, the 3D powder bed material, when fused in a 3D printing process, provides a 3D article having a Young's Modulus determined in accordance with ASTM D638 that is increased by about 10%, about 20%, about 30%.

In some examples, the 3D powder bed material, when fused in a 3D printing process, provides a 3D printed article having a Young's Modulus determined in accordance with ASTM D638 that is in a range from about 1 to about 100 Megapascals. In some examples, the 3D powder bed material, when fused in a 3D printing process, provides a 3D printed article having a Young's Modulus determined in accordance with ASTM D638 that is in a range from about 10 to about 100 Megapascals, from about 20 to about 100 Megapascals, about 30 to about 100 Megapascals, about 30 to about 60 Megapascals, about 30 to about 40 Megapascals, about 30 to about 40 Megapascals, or about 32 to about 36 Megapascals. In some examples, the 3D powder bed material, when fused in a 3D printing process, provides a 3D article having a Young's Modulus determined in accordance with ASTM D638 that is in about 1 Megapascal, about 5 Megapascals, about 10 Megapascals, about 20 Megapascals, about 30 Megapascals, about 40 Megapascals, about 50 Megapascals, about 60 Megapascals, about 70 Megapascals, about 70 Megapascals, about 80 Megapascals, about 90 Megapascals, or about 100 Megapascals.

In some examples, the 3D powder bed material, when fused in a 3D printing process, provides the 3D printed article having an ultimate tensile strength as determined in accordance with ASTM D638 that is equal to or greater than 3 megapascals. In some examples, the 3D powder bed material, when fused in a 3D printing process, provides the 3D printed article having an ultimate tensile strength as determined in accordance with ASTM D638 that is greater than about 3 megapascals, about 4 megapascals, about 5 megapascals, about 6 megapascals, about 7 megapascals, about 8 megapascals, about 9 megapascals, about 10 megapascals, about 11 megapascals, about 12 megapascals, about 13 megapascals, about 14 megapascals, about 15 megapascals, about 16 megapascals, about 17 megapascals, about 18 megapascals, about 19 megapascals, or about 20 megapascals.

In some examples, the 3D powder bed material when fused in a 3D printing process, provides a 3D printed article having an elongation at break as determined in accordance with ASTM D638 that is equal to or greater than 100 percent. In some examples, the 3D powder bed material when fused in a 3D printing process, provides a 3D printed article having an elongation at break as determined in accordance with ASTM D638 that is greater than about 100 percent, greater than about 200 percent, greater than about 300 percent, greater than about 400 percent, greater than about 500 percent, greater than about 600 percent, greater than about 700 percent, greater than about 800 percent, greater than about 900 percent, greater than about 1000 percent, greater than about 1100 percent, greater than about 1200 percent, greater than about 1300 percent, greater than about 1400 percent, greater than about 1500 percent, greater than about 1600 percent, greater than about 1700 percent, greater than about 1800 percent, greater than about 1900 percent, or greater than about 2000 percent.

In some examples, the 3D powder bed material when fused in a 3D printing process, provides a 3D printed article that is an in-sole, an out-sole, and/or a mid-sole that has enhanced stiffness. For instance, in some examples the 3D powder bed material when fused in a 3D printing process, provides an in-sole having enhanced stiffness (e.g., having a Young's Modulus that is increased by 10% or more), and yet that has other suitable properties (e.g., an ultimate tensile strength that is greater than 3 megapascals and/or an elongation at break that is greater than or equal to 500 percent).

In some examples, a 3D printing system for forming the 3D article (e.g., the 3D object or part) includes a supply bed (including a supply of the build material described above), a delivery piston, a roller, a fabrication bed (having a contact surface), and a fabrication piston. Each of these physical elements may be operatively connected to a central processing unit of the 3D printing system. The central processing unit (e.g., running computer readable instructions stored on a non-transitory, tangible computer readable storage medium) manipulates and/or transforms data represented as physical (electronic) quantities within the printer's registers and memories to control the physical elements to create the 3D object or part. The data for the selective delivery of the build material described above and the fusing agent described above may be derived from a model of the 3D object or part to be formed.

The delivery piston and the fabrication piston may be the same type of piston, but are programmed to move in opposite directions. In an example, when a first layer of the 3D object(s) or part(s) is to be formed, the delivery piston may be programmed to push a predetermined amount of the build material out of the opening in the supply bed and the fabrication piston may be programmed to move in the opposite direction of the delivery piston in order to increase the depth of the fabrication bed. The delivery piston advances enough so that when the roller pushes the build material into the fabrication bed and onto the contact surface, the depth of the fabrication bed is sufficient so that a layer of the build material may be formed in the bed. The roller is capable of spreading the build material into the fabrication bed to form the layer, which is relatively uniform in thickness. In an example, the thickness of the layer ranges from about 40 μm to about 300 μm, although thinner or thicker layers are possible. In some examples, the roller is replaced by other tools, such as a blade that may be used for spreading different types of powders, or a combination of a roller and a blade.

After the layer of the build material is deposited in the fabrication bed, the layer is, in some instances, exposed to heating. Heating is, in some instances, performed to pre-heat the build material, and thus a heating temperature below the melting point of the build material. As such, the temperature selected depends upon the build material that is used. As examples, the heating temperature may be from about 5° C. to about 50° C. below the melting point of the build material. In an example, the heating temperature ranges from about 50° C. to about 200° C. In another example, the heating temperature ranges from about 150° C. to about 170° C.

Pre-heating the layer of the build material may be accomplished using any suitable heat source that exposes all of the build material in the fabrication bed to the heat. Examples of the heat source include a thermal heat source or an electromagnetic radiation source (e.g., infrared (IR), microwave, or combinations thereof).

After pre-heating the layer, the fusing agent is selectively applied on a portion of the build material in the layer. The fusing agent may be dispensed from an inkjet printhead. One or multiple printheads may be used that span the width of the fabrication bed. The printhead may be attached to a moving XY stage or a translational carriage that moves the printhead adjacent to the fabrication bed in order to deposit the fusing agent in targeted area(s).

The printhead may be programmed to receive commands from the central processing unit and to deposit the fusing agent according to a pattern of a cross-section for the layer of the 3D object or part that is to be formed. As used herein, the cross-section of the layer of the object(s) or part(s) to be formed refers to the cross-section that is parallel to the contact surface.

In an example, the printhead selectively applies the fusing agent on a portion of the layer that are to be fused to become the first layer of the 3D object or part. As an example, if the first layer is to be shaped like a cube or cylinder, the fusing agent is deposited in a square pattern or a circular pattern, respectively, on at least a portion of the layer of the build material.

Examples of fusing agent include water-based dispersions having a radiation absorber agent. The absorber agent may be a near infrared light absorber. Examples of suitable absorber agents include various inorganic metal oxide. In some examples, the dye or pigment in the fusing agent include any color in addition to the inorganic metal oxide.

The aqueous nature of the fusing agent allows the fusing agent to penetrate, at least partially, into the layer of the build material. In some instances, the build material is hydrophobic, and the presence of a co-solvent and/or a surfactant in the fusing agent may assist in obtaining wetting behavior.

It is to be understood that an individual fusing agent may be selectively applied to form the layer of the 3D object or part, or multiple fusing agents may be selectively applied to form the layer of the 3D object or part.

After the fusing agent is/are selectively applied on the targeted portion, a detailing agent, in some instances, is selectively applied on the same and/or on different portion of the build material. The detailing agent, in some instances, includes a colorant, a surfactant, a co-solvent, and a balance of water. In some examples, the detailing agent includes these components, and no other components. In some instances, the detailing agent, in some instances, excludes specific components, such as additional colorants (e.g., pigments). In some other examples, the detailing agent further includes an anti-kogation agent, a biocide, or combinations thereof. The detailing agent prevents or reduces cosmetic defects (e.g., color and white patterns) by adding the colorant, which diffuses into and dyes the build material particles at least at the edge boundary.

The above 3D printing stages, in some instances, are repeated in different orders to obtain the 3D printed object(s) or part(s).

In some examples, the detailing agent described above is the same as the colored ink(s) described above.

Unless otherwise stated, any feature described hereinabove is combined with any example or any other feature described herein.

In describing and claiming the examples disclosed herein, the singular forms "a," "an," and "the" include plural referents unless the context clearly dictates otherwise.

It is to be understood that concentrations, amounts, and other numerical data may be expressed or presented herein in range formats. It is to be understood that such range formats are used merely for convenience and brevity and thus should be interpreted flexibly to include not just the numerical values explicitly recited as the end points of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same applies to ranges reciting an individual numerical value.

Reference throughout the specification to "one example," "some examples," "another example," "an example," and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

All amounts disclosed herein and in the examples below are in wt % unless indicated otherwise. Unless otherwise stated, references herein to "wt %" of a component are to the weight of that component as a percentage of the whole composition comprising that component. For example, references herein to "wt %" of, for example, a solid material such as polymer(s) or colorant(s) dispersed in a liquid composition are to the weight percentage of those solids in the composition, and not to the amount of that solid as a percentage of the total non-volatile solids of the composition.

If a standard test is mentioned herein, unless otherwise stated, the version of the test to be referred to is the most recent at the time of filing this patent application.

To further illustrate the present disclosure, examples are given herein. It is to be understood that these examples are provided for illustrative reasons and are not to be construed as limiting the scope of the present disclosure.

EXAMPLES 3D powder bed materials that form a 3D printed article with enhanced stiffness (EX1-EX5) and comparative 3D powder bed materials (CE1-CE4) were prepared as follows.

For EX1-EX5 respective mixtures were formed using a LABRAM II acoustic mixer by RESODYN to mix an amount of elastomeric build material with an amount of polyol stiffening additive as shown in Table 1. For CE1-CE4 an amount of elastomeric build material was provided sans polyol stiffening additive as shown in Table 1. Build material additives form the balance of the build materials and are the same for each of the respective examples and the corresponding comparative examples.

TABLE 1

| | Build material | Build material amount (wt %) | Polyol stiffening additive | Polyol stiffening additive amount (wt %) |
|---|---|---|---|---|
| CE1 | TPA | 95.00-99.50 | — | 0 |
| EX1 | TPA | 85.50-89.55 | PSA | 10 |
| CE2 | TPU1 | 95.00-99.50 | — | 0 |
| EX2 | TPU 1 | 92.15-96.52 | PSA | 3 |
| EX3 | TPU 1 | 85.50-89.55 | PSA | 10 |
| CE3 | TPU 2 | 95.00-99.50 | — | 0 |
| EX4 | TPU 2 | 85.50-89.55 | PSA | 10 |
| CE4 | TPA | 95.00-99.50 | — | 0 |
| EX5 | TPA | 85.50-89.55 | PSA | 10 |

3D articles were made from 3D powder bed materials (EX1-EX5) and comparative 3D powder bed materials (CE1-CE4) using injection molding or 3D printing methods as indicated in Table 2.

Injection molded 3D articles (CE1-CE3 and EX1-EX4) were formed in accordance with ASTM D638 for Type 5 Tensile bars (using a HAAKE MINIJET II available from THERMOSCIENTIFIC) at a mold temperature of 50° C. and maintained at a melt temperature of 190° C.

3D printed articles (CE4 and EX5) were formed using a three-dimensional printer and were each conducted in the same manner but with the different respective materials is indicated in Table 1.

The Young's Modulus, elongation at break, ultimate tensile strength (UTS) of the 3D articles as determined in accordance with ASTM D638 (with a tensile tester available from INSTRON) and the results are summarized in Table 2.

TABLE 2

| | 3-D Object Formation method | Young's Modulus (MPa) | Elongation at break (%) | UTS (MPa) |
|---|---|---|---|---|
| CE1 | Injection molded | 35* | 1800* | 18* |
| EX1 | Injection molded | 77* | 1950* | 11* |
| CE2 | Injection molded | 12* | 3200* | 24* |
| EX2 | Injection molded | 22* | 2000* | 16* |
| EX3 | Injection molded | 69* | 350* | 8* |
| CE3 | Injection molded | 2* | 2800* | 23* |
| EX4 | Injection molded | 9 | 2300 | 14 |
| CE4 | 3D printed | 29* | 850* | 12* |
| EX5 | 3D printed | 34** | 650** | 10** |

Where indicated the symbol (*) refers to a value that is a mean of three instances of the example conducted with the same components at the same conditions. Where indicated the symbol (**) refers to a value that is a mean of four instances of the example conducted with the same components at the same conditions.

The above examples show that the 3D powder bed materials that included the elastomeric build material and the polyol stiffening additive form a 3D printed article with enhanced stiffness (increased Young's Modulus values) when compared with 3D powder bed material sans the polyol stiffening additive. The above examples further show that the 3D powder bed materials that form 3D printed article with enhanced stiffness are suitable to be employed in the absence of fillers/and/or fibers, and yet still realize the enhanced stiffness.

Figure 2:
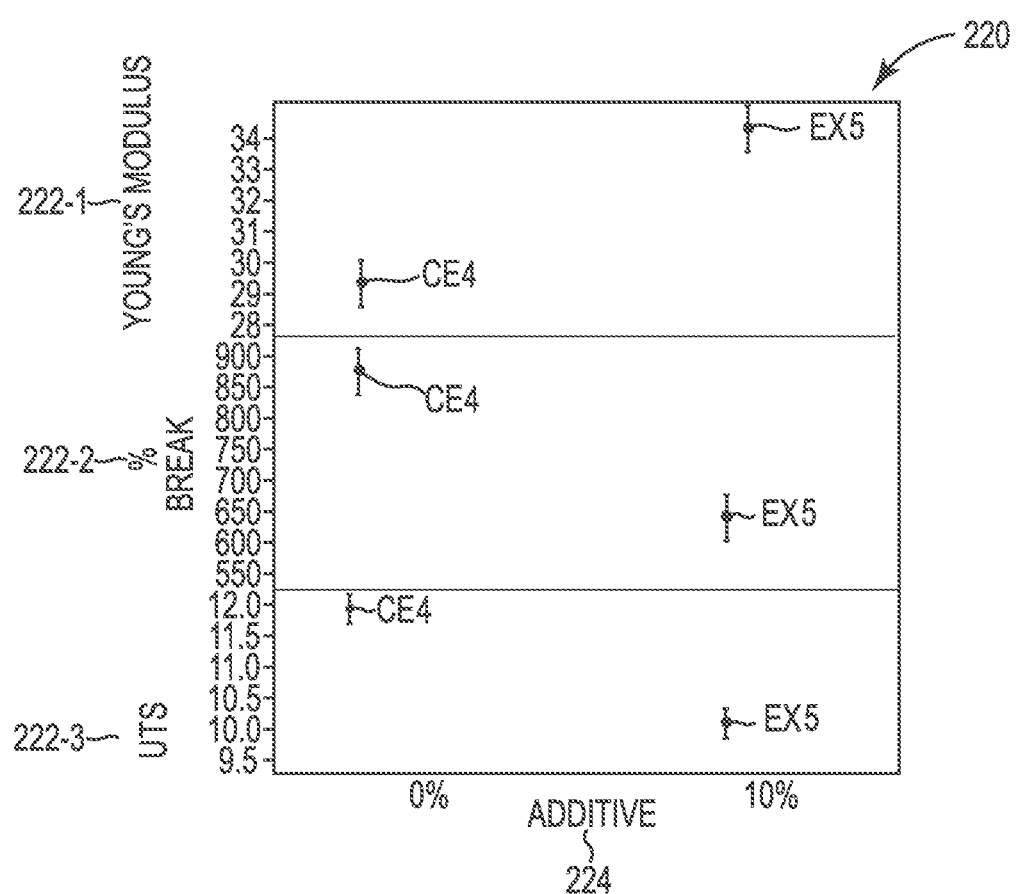
FIG. 2 is a graph showing Young's Modulus, elongation at break, and ultimate tensile strength values of different 3D printed articles formed from 3D powder bed material formulations with various amounts of polyol stiffening additive.

For instance, FIG. 1 is a graph showing Young's Modulus values of different 3D injection molded articles formed from 3D powder bed material formulations with various amounts of polyol stiffening additive 104. As illustrated in FIG. 1, the 3D articles of the examples (EX1, EX2, EX3, and EX4) which employ TPA (at 106-1), TPU 1 (at 106-2), TPU 1 (at 106-2), and TPU 2 (106-3), respectively, are mixed with the polyol stiffening additive each have improved (larger) Young's Modulus values 106 as compared to the 3D articles in the corresponding comparative examples (CE1, CE2, and CE3) which employ TPA, TPU 1, and TPU 2, respectively, sans the polyol stiffening additive. FIG. 2 is a graph 220 showing respective Young's Modulus 222-1, elongation at break 222-2, and UTS 222-3 of different 3D printed articles. Similar to FIG. 1, the 3D printed articles of the example (EX5) in FIG. 2 which include an amount of polyol stiffening additive have improved (larger) values of Young's Modulus as compared to the Young's Modulus values of the 3D articles in the comparative example (CE4) which are sans the polyol stiffening additive.

While several examples have been described in detail, it is to be understood that the disclosed examples may be modified. Therefore, the foregoing description is to be considered non-limiting.

What is claimed is:

1. A three-dimensional (3D) powder bed material that forms a 3D printed article, the 3D powder bed material consisting of:
   an elastomeric build material; and
   a polyol stiffening additive having from 3 to 7 carbon atoms, the polyol stiffening additive being present in an amount of from about 2 weight percent to about 20 weight percent of a total weight of the 3D powder bed material.

2. The 3D powder bed material of claim 1, wherein the elastomeric build material is a polyamide thermoplastic elastomer (TPA) or a thermoplastic polyurethane (TPU).

3. The 3D powder bed material of claim 2, wherein the elastomeric build material comprises 100 weight percent of the TPA or the TPU.

4. The 3D powder bed material of claim 1, wherein the polyol stiffening additive is selected from the group consisting of a diol, a triol, a tetrol, and any combination thereof.

5. The 3D powder bed material of claim 1, wherein the polyol stiffening additive is pentaerythritol.

6. The 3D powder bed material of claim 1, wherein the polyol stiffening additive is less than 10 weight percent of the total weight of the 3D powder bed material.

7. The 3D powder bed material of claim 1, wherein the 3D powder bed material, when fused in a 3D printing process, provides the 3D printed article having a Young's Modulus that is increased by at least 10% as compared to a Young's Modulus of a 3D printed article formed from the elastomeric build material in the absence of the polyol stiffening additive.

8. The 3D powder bed material of claim 1, wherein the 3D powder bed material, when fused in a 3D printing process, provides the 3D printed article having an ultimate tensile strength that is greater than or equal to 3 megapascals.

9. The 3D powder bed material of claim 1, wherein the 3D powder bed material, when fused in a 3D printing process, provides a 3D printed article having an elongation at break that is greater than or equal to 500 percent.

10. A method of making a three-dimensional (3D) printed article, the method comprising:
    applying a 3D powder bed material consisting of a mixture of an elastomeric build material and a polyol stiffening additive having from 3 to 7 carbon atoms to a fabrication bed; and
    fusing the 3D powder bed material to form a 3D printed article.

11. The method of claim 10, further comprising:
selectively applying a fusing agent to the 3D powder bed material; and
responsive to the selectively applying of the fusing agent to the 3D powder bed material, fusing the 3D powder bed material to form the 3D printed article.

12. The method of claim 11, wherein the fusing agent comprises water and an absorber agent, and wherein the fusing of the 3D powder bed material comprises exposing the fabrication bed to radiation energy to selectively fuse portions of the 3D powder bed material in contact with the absorber agent and thereby form the 3D printed article.

13. A three-dimensional (3D) printed article formed by:
applying a 3D powder bed material consisting of a mixture of an elastomeric build material and a polyol stiffening additive having from 3 to 7 carbon atoms to a fabrication bed;
selectively applying a fusing agent to the 3D powder bed material; and
responsive to the selectively applying of the fusing agent to the 3D powder bed material, fusing the 3D powder bed material to form the 3D printed article.

14. The 3D printed article of claim 13, wherein the 3D printed article has a Young's Modulus that is increased by at least 10% as compared to a Young's Modulus of a 3D printed article formed from the elastomeric build material in the absence of the polyol stiffening additive.

* * * * *